United States Patent [19]

Chambers et al.

[11] Patent Number: 4,805,081
[45] Date of Patent: Feb. 14, 1989

[54] MULTI-MODE CONTROL SYSTEMS FOR HIGH-FREQUENCY RESONANT INVERTERS

[75] Inventors: Derek Chambers, Bayville; Andrzej Bortkiewicz, Elmhurst, both of N.Y.

[73] Assignee: Spellman High Voltage Electronics Corp., Plainview, N.Y.

[21] Appl. No.: 67,378

[22] Filed: Jun. 29, 1987

[51] Int. Cl.$^4$ ............................................. H02P 13/20
[52] U.S. Cl. ......................................... 363/96; 363/71; 363/136
[58] Field of Search ...................... 363/41, 71, 96, 136

[56] References Cited

U.S. PATENT DOCUMENTS

| | | | |
|---|---|---|---|
| 4,488,214 | 12/1984 | Chambers | 363/96 X |
| 4,587,604 | 5/1986 | Nerone | 363/17 |
| 4,617,675 | 10/1986 | Ashikaga et al. | 363/41 X |
| 4,641,232 | 2/1987 | Pitel | 363/71 |
| 4,661,897 | 4/1987 | Pitel | 363/17 |
| 4,677,535 | 6/1987 | Kawabata et al. | 363/65 |
| 4,695,933 | 9/1987 | Nguyen et al. | 363/17 |

Primary Examiner—Patrick R. Salce
Assistant Examiner—Marc S. Hoff
Attorney, Agent, or Firm—Gottlieb, Rackman & Reisman

[57] ABSTRACT

An inverter system having two resonating current sources which are resonant at the same frequency. The currents of the two sources are combined. At low power levels, the currents are substantially out of phase and the frequency is adjusted. At intermediate power levels, the currents are adjusted in phase and the frequency is fixed. At high power levels, the currents are substantially in phase and the frequency is adjusted.

26 Claims, 16 Drawing Sheets

TYPICAL FREQUENCY/ PHASE RELATIONSHIPS (a) ZENER DIODE CHARACTERISTIC (b) VOLTAGE-CURRENT RELATIONSHIP WHICH DETERMINES FREQUENCY CONTROL (c) VOLTAGE-VOLTAGE RELATIONSHIP WHICH DETERMINES PHASE CONTROL

MULTI-MODE CONTROL SYSTEMS FOR HIGH-FREQUENCY RESONANT INVERTERS

This invention relates to power supplies, and more particularly to improvements in the control of sine-wave-type inverter systems.

Power supplies are used in almost all electronic equipments where power for operating the circuits is derived from a power line typically providing 115 V AC or 230 V AC at 50 Hz or 60 Hz. A power supply converts the line power into the particular form required by the equipment; for example, 5 V DC is used in computer circuits, while 75,000 V is required to operate X-Ray tubes.

Developments in power supply technology are being directed toward a reduction in size and weight, and an increase in efficiency. these goals may be achieved with the application of well-known inverter and switching techniques, utilizing frequencies much higher than the power line frequencies.

In most electronic applications, control and regulation of the output voltage are usually required, so that operation of the electronic equipment is unaffected by changes in line voltage or output loading conditions. Regulation in switching power supplies is generally achieved by adjusting the ratio of the "on" to "off" time of an electronic switch. Most switching power supplies operate at a fixed frequency, typically between 20 kHz and 100 kHz, and control of the output is achieved by varying the duration of the "on" pulse, a technique known as pulse width modulation.

The development of new switching devices (e.g., power MOSFETs and fast switching SCRs) and low-loss capacitors with polypropylene dielectric allow very high currents to be controlled at high frequencies, and has opened up new possibilities of high frequency power conversion at high power levels. At power levels in the multi-kilowatt range it becomes more important to switch the power devices on and off at low instantaneous values of current so that losses and stresses in the switching components are reduced, and radio frequency interference (RFI) is minimized. Since these conditions are conveniently realized with sinusoidal current waveforms, series resonant converter systems operating at high frequency (e.g., greater than 20 kHz) are now being developed and produced for high power applications.

The problem with this type of circuit is that, in its basic form, regulation is obtained by control of the repetition frequency of the inverter rather than by pulse width modulation. At the lower frequencies (at the lower power levels), the audio noise generated by the magnetic components can become intolerable, and the magnitude of the output voltage ripple can also be excessive. Furthermore, the design of a power transformer which can operate over a wide frequency range is difficult, particularly when high step-up or step-down ratios are needed for the generation of high or low voltages. In these cases, resonance of the leakage inductance with the interwinding and circuit capacitance can cause instabilities in the control circuit.

One method of overcoming this control problem is described in U.S. Pat. No. 4,488,214. In the system disclosed in that patent, typically used for power supplies in the 3 kW–30 kW range, a combination of digital and analog techniques is used for regulation and control. Multiple series resonant circuits, used as current sources, having the same resonant frequency but operating at different current levels, supply power to the load in controlled combinations in such a way as to always keep the frequency at a high value. Digital control of the combination of resonant circuits is determined by feedback from the output voltage or current sensing circuits. Precise analog control of the output is maintained by a fine adjustment in operating frequency over a relatively narrow range.

A disadvantage of this control system in some applications is the slow response to load changes which results from the relatively long settling time of the digital control loop. Also, the change in frequency during selection of the lowest power inverters can be as high as two to one. (Although at low frequencies a hum may be audible, at low frequencies the power level is low so that the hum level is not objectionable.)

It is an object of this invention to provide regulation and control of a resonant converter over a wide power range while maintaining a fast response to load changes, and allowing operation at a more constant high frequency.

In accordance with the principles of the invention, at least two resonating current-supplying sources are provided, the two sources being resonant at the same frequency. The frequency or repetition rate of the sources can be varied. (The resonant frequency is determined solely by the values of the resonating capacitor and inductance, and is something totally different from the frequency of operation, i.e., the frequency at which the SCRs are fired. In this description the term resonant frequency is used whenever that is the subject.) Currents from the two sources are supplied at the same frequency, but the relative phases can be adjusted such that the currents add to or subtract from each other. The power output can be increasing by increasing the frequency, or by bringing the two currents closer in phase with each other.

At lower power levels, the two currents are substantially out of phase. The frequency is increased rapidly as a function of desired current output and, in the illustrative embodiment of the invention, the frequency rises typically to about 18 kHz by the time the inverter supplies only a few percent of the maximum output power. The frequency then remains substantially constant, and the output power can be increased by bringing the currents closer in phase. Instead of the two currents substantially cancelling each other, they begin to aid each other in order to increase the output power. As will be described, in the preferred embodiment there is an abrupt change in the phase in about the midddle of this low-medium power operation. In order to reach still higher power levels, at the upper range of the control, after the currents are brought substantially in phase with each other, the frequency is increased. While the first frequency control covers the lower few percent of the power range, the second frequency control covers about the upper thirty percent of the power range. The phase control, in two steps in the preferred embodiment of the invention, controls the power range from a few percent to about seventy percent of maximum.

Further objects, features and advantages of the invention will become apparent upon consideration of the following detailed description in conjunction with the drawing, in which:

FIG. 11 is the transfer function applicable to the "no-gap" current waveform condition;

Figure 4:
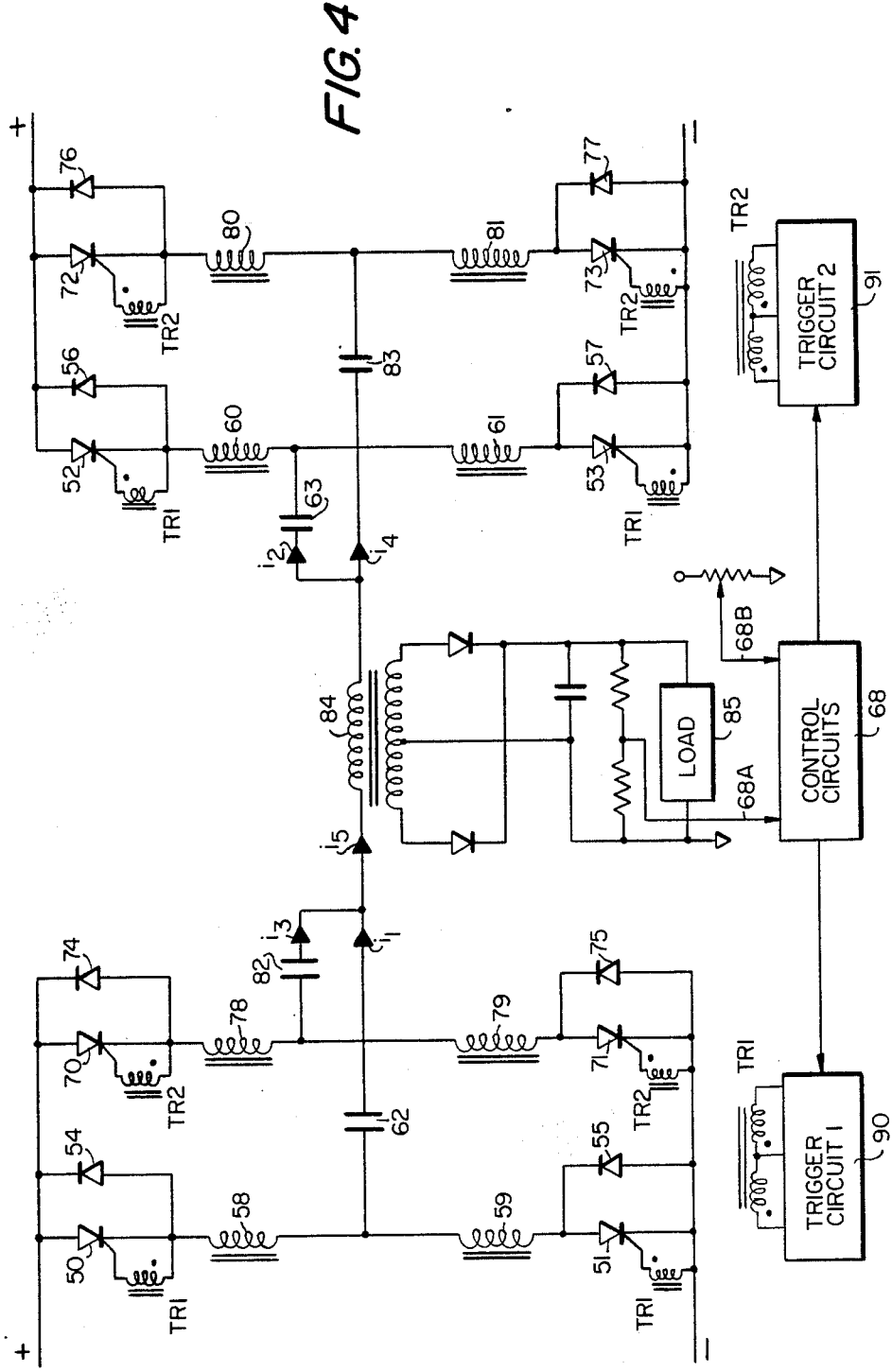
FIG. 4 is a schematic diagram of the illustrative embodiment of the invention.
Figure 12:
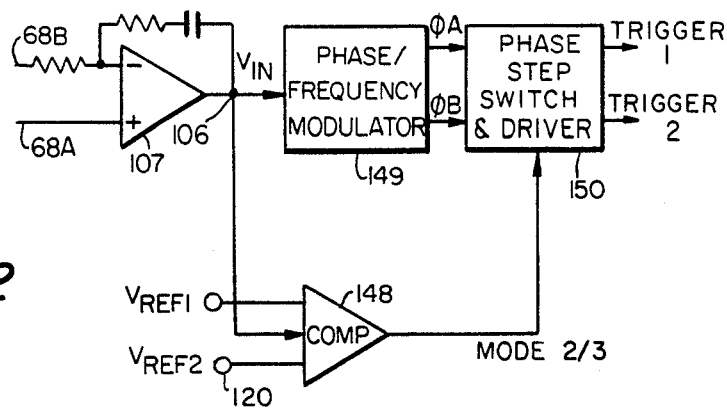
FIG. 12 is a block diagram of the control circuits block 68 of FIG. 4.
Figure 15:
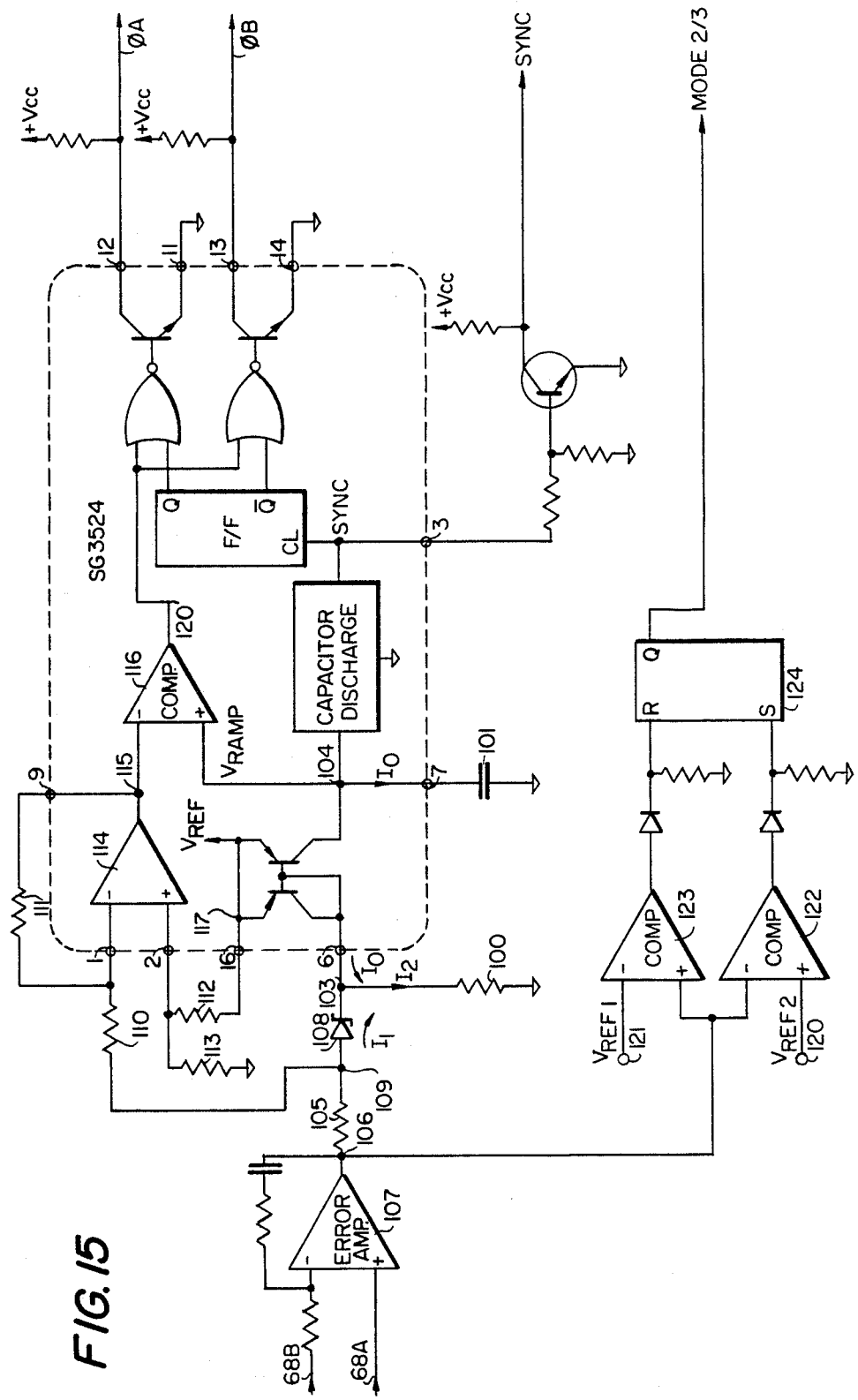
Figure 16:
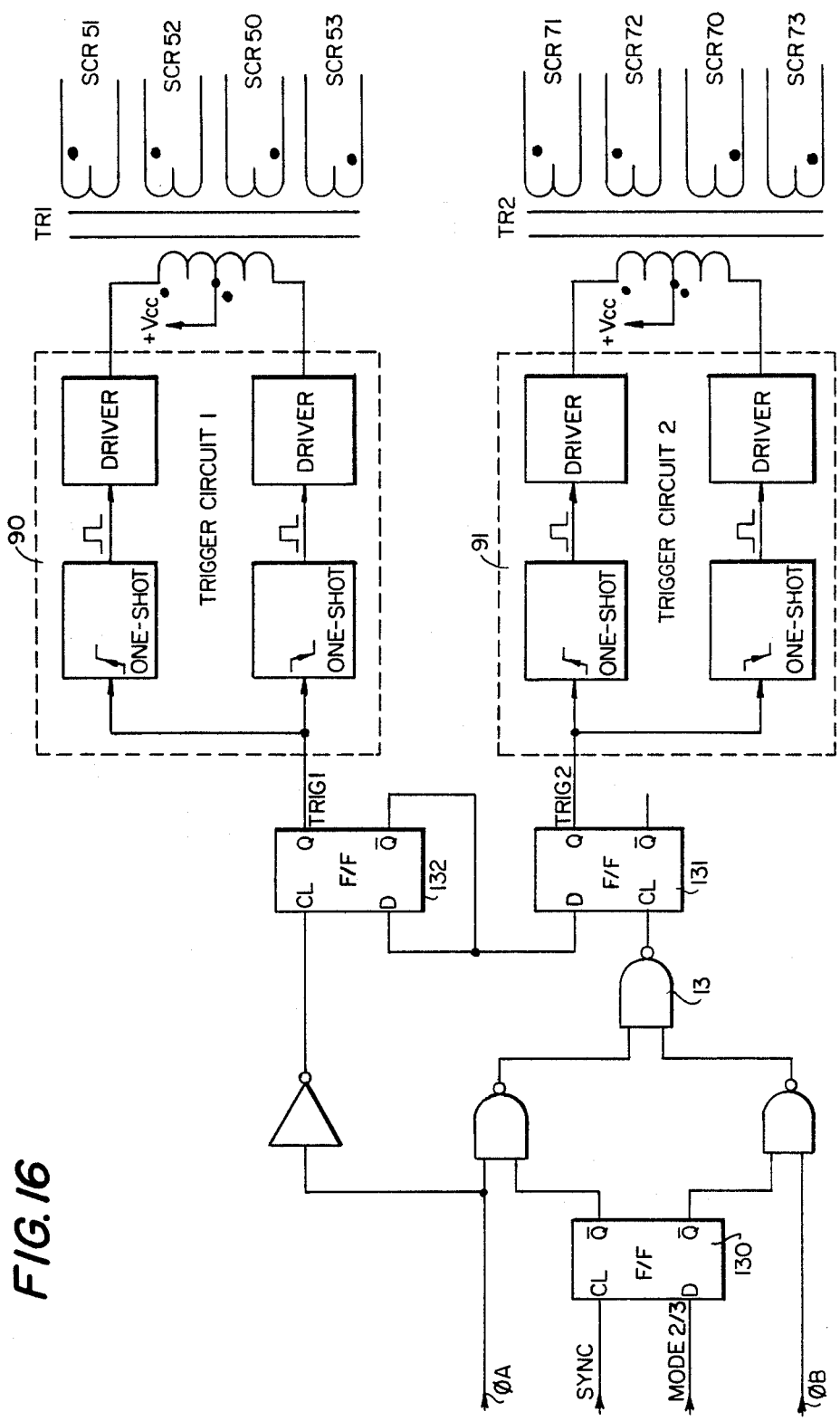
Figure 17:
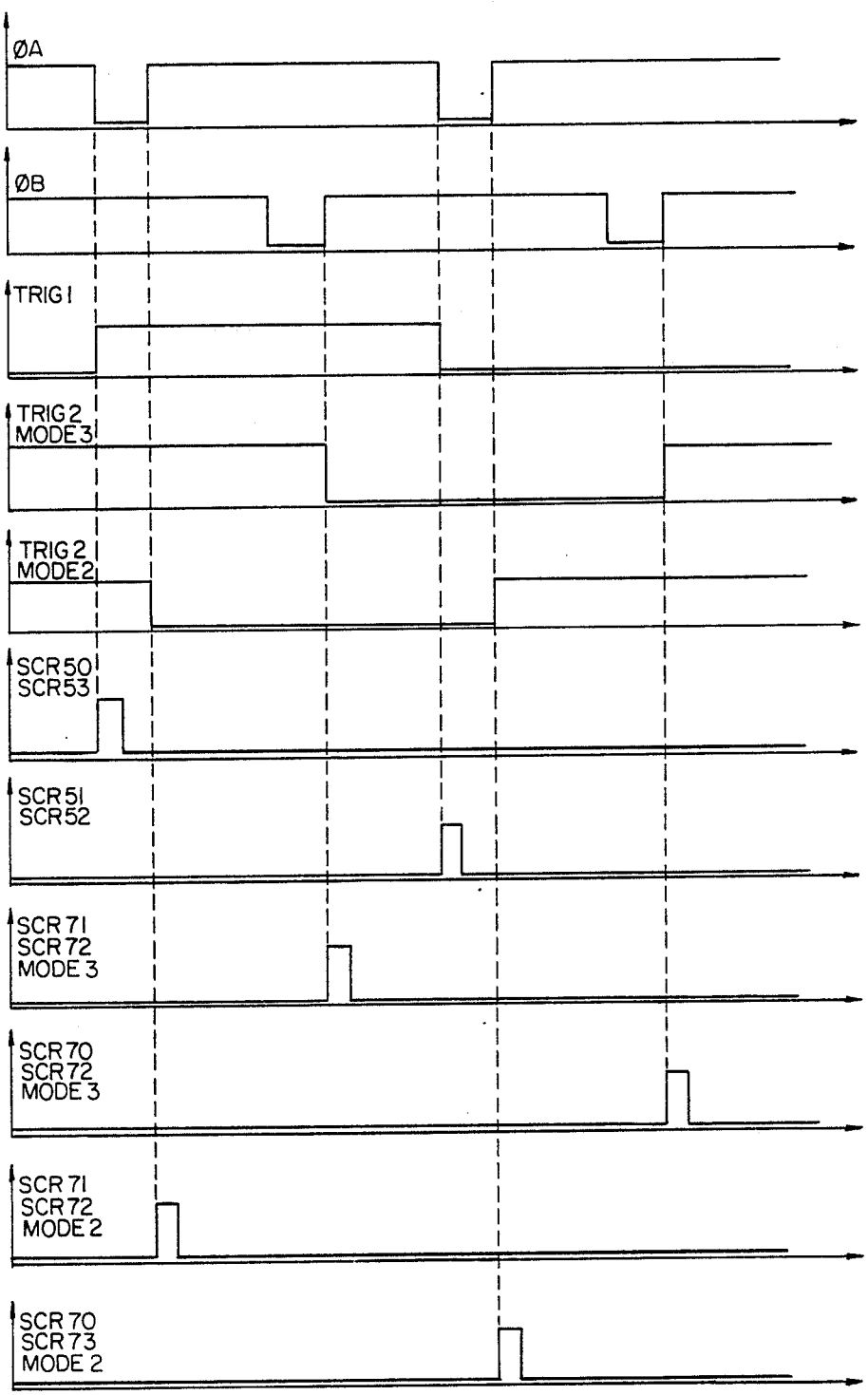
Figure 18A:
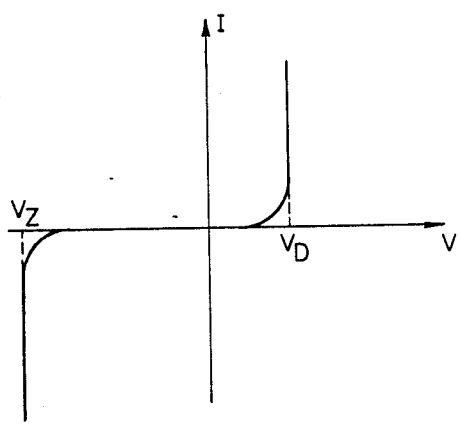

FIG. 15 shows amplifier 107 of FIG. 12, together with a detailed schematic for comparator 148 and phase/frequency modulator 149 (with the SG3524 integrated circuit being shown only symbolically);

FIG. 16 is a detailed schematic of the SCR trigger circuits 90 and 91 of FIG. 4, together with phase step switch and driver 150 of FIG. 12;

FIG. 17 consists of timing waveforms showing the relationships of signals identified on FIG. 16, including differences in operation during modes 2 and 3; and FIG. 18 depicts (a) the current-voltage characteristic of Zener diode 108 on FIG. 15, (b) the voltage-current relationship which determines frequency control, and (c) the voltage-voltage relationship which determines phase control.

Figure 1:
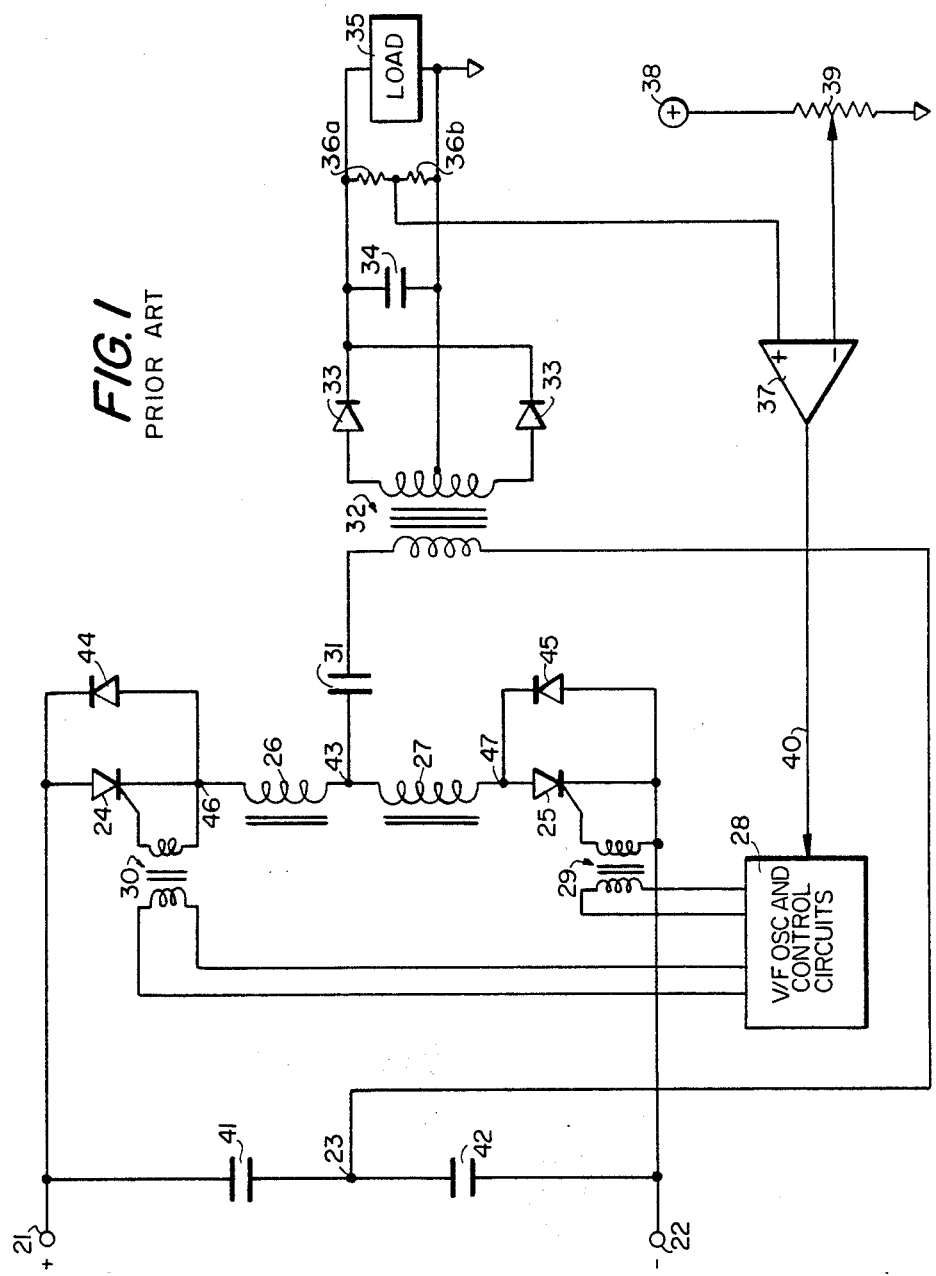
FIG. 1 depicts the basic prior art resonant circuit which forms the heart of present-day high-power, high-frequency resonant inverter power systems.

Referring to the basic prior art resonant inverter circuit of FIG. 1, DC input of typically 300 V derived from rectified line voltage is applied across terminals 21 and 22, with terminal 21 typically being at a potential of +150 volts with respect to the potential at node 23. The inverter includes two series circuits, each having an SCR 24 or 25, and an inductor 26 or 27. Typically, each inductor has a magnitude of 10 microhenries. Control circuit 28 alternately triggers the two SCRs through pulse transformers 29 and 30, each secondary winding being connected between the gate and cathode of a respective SCR. The resonant output circuit includes a capacitor 31 and a load. The inverter functions to transform the DC input potential to a sine wave AC current in a load. In a typical application, however, what is desired is a DC load current. Thus, what is shown in FIG. 1 is a standard rectifier which includes a transformer 32, a pair of diodes 33, and a filter capacitor 34, together with load 35.

In order to control the amplitude of the DC output, a feedback circuit is employed. To control the output voltage, resistors 36a and 36b feed a fraction of the voltage to an input of error amplifier 37. A reference potential 38 is extended through a variable potentiometer 39 to the other input of the error amplifier. The amplifier output is thus an indication of the difference between the actual DC potential derive from resistors 36a and 36b, and that which is desired. The output of the amplifier is extended to the input of the control circuit 28. In its simplest form, well known in the art, the control circuit is a voltage-to-frequency converter which alternately pulses transformers 29 and 30 at a repetition frequency determined by the potential on the control line 40. The voltage-to-frequency converter is arranged so that an increase in voltage on the control line 40 causes a corresponding reduction in frequency. This standard type of feedback circuit causes the SCRs to be fired more frequently when the DC output must be increased and less frequently when the DC output must be decreased. Control and feedback circuits are well known in the art, and any of many standard circuits may be employed.

Operation of the power circuit can be best understood by assuming that resonating capacitor 31 is initially discharged, that no current flows in the circuit, and that the load between capacitor 31 and node 23 is replaced by a short circuit. In such a case, nodes 23 and 43 are both initially at a common potential. When SCR 24 is fired, a 150-volt potential appears across inductor 26, capacitor 31 and the shorted load. typically, capacitors 41 and 42 may have twenty times the capacitance of capacitor 31, so the effect of capacitors 41 and 42 on the resulting resonant frequency is small. Current starts to flow through inductor 26, through capacitor 31 and down through the shorted load. Even if the load has zero impedance, as assumed, the peak value of the sine wave current is limited by the resonant circuit comprising inductor 26 and capacitor 31, the peak current being determined by the product of the DC input voltage and the square root of the ratio of the magnitudes of capacitor 31 and inductor 26, as is known in the art.

Because the inductor and the capacitor comprise a resonant circuit, the current reverses direction after one-half cycle. As the current reverses direction, SCR 24 is forced to turn off. The current now flows upward through inductor 26 and commutating diode 44. Assuming a zero impedance load and insignificant losses in inductor 26 and capacitor 31, the negative current peak has the same magnitude as the positive current peak. At the end of the second half cycle, diode 44 ceases to conduct. Current flow therefore ceases altogether because positive current (down through inductor 26) can flow only when SCR 24 is on, and it is not fired again. One of the main advantages of the use of a resonant circuit in this manner is that current flow always ceases at the end of a cycle of the oscillating waveform at the point where the current is zero. Where the current otherwise to cease abruptly, a large transient voltage would be induced and the resulting radiation might interfere with connected electronic equipment, and dissipative snubbers would be required.

With a zero impedance load, the potential at node 43 after the first half cycle is 300 volts, and the potential at the end of the overall cycle is once again zero. In a practical situation, of course, the load does have impedance. Also, at the end of a cycle when the current has returned to zero, the voltage across capacitor 31 will not be zero, and the capacitor remains charged. Where SCR 24 the only switching device employed, each firing of it would increase the charge on capacitor 31, and after several cycles of operation the capacitor would be charged to the point at which no more power could be delivered through it to the load.

In order to restore the charge across capacitor 31, SCR 25 is employed. Each time that this device is fired, it causes a current to flow in the reverse direction through the load, thus balancing the current in capacitor 31 and output transformer 32, and giving rise to AC voltage waveforms across the windings of the transformer.

Figure 2:
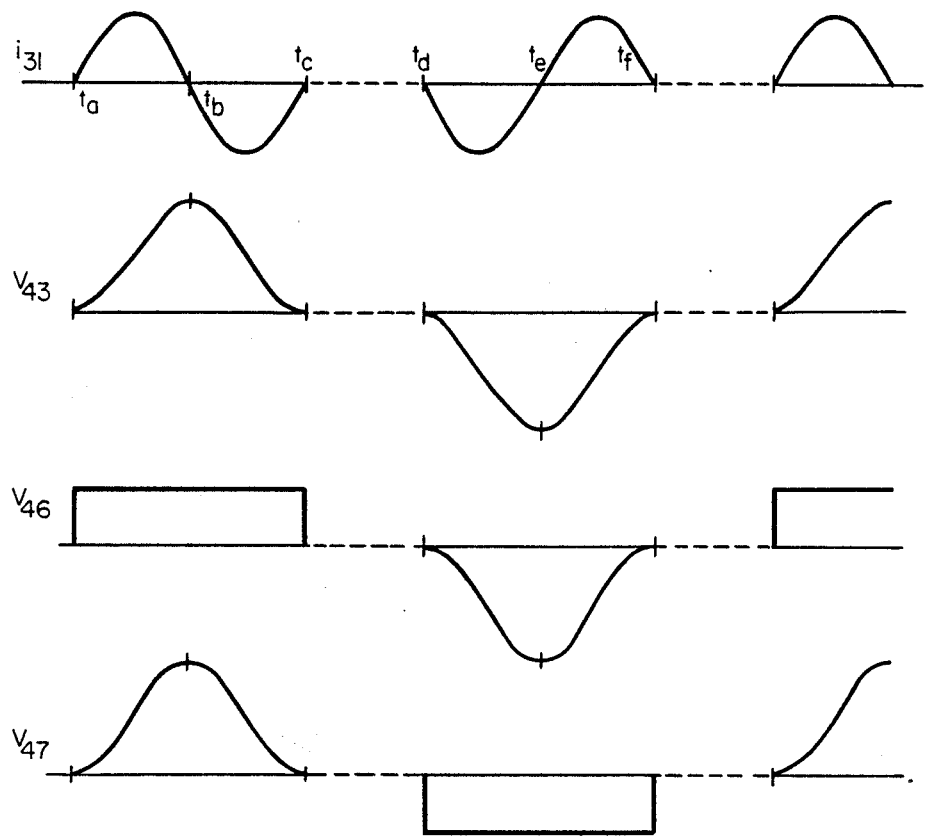
FIG. 2 depicts current and voltage waveforms applicable to the operation of the circuit of FIG. 1 under shorted-load conditions.

FIG. 2 depicts several current and voltage waveforms for the case of a short-circuited load. The top waveform represents the current through capacitor 31, with positive current flowing from left to right and with the peak current typically being about 50 amperes. At time $t_a$, SCR 24 is fired, and a resonating current starts to flow through the SCR, inductor 26 and capacitor 31. The current reaches its peak value when the voltage at node 43, shown in the second waveform, reaches the supply voltage of 150 V. The current then starts to decrease and goes to zero at time $t_b$, with the potential at node 43 rising to 300 volts and the SCR turning off. During the second half cycle, diode 44 conducts, a negative current flows, and the voltage at node 43 returns to zero. At time $t_c$, current stops flowing and the voltage at node 43 remains at zero. Some time later, at time $t_d$, SCR 25 is triggered. Now current first flows through the capacitor from right to left. At time $t_e$, SCR 25 turns off and the voltage at node 43 is at $-300$ volts. Diode 45 conducts during the second half cycle, all current flow ceasing at time $t_f$. The gap between times $t_c$ and $t_d$ depends on the frequency of operation, i.e., the desired power level.

The third waveform on FIG. 2 depicts the voltage at node 46. For as long as current flows through inductor 26, SCR 24 or diode 44, node 46 is connected to the potential at terminal 21. When both SCR 24 and diode 44 are off, the potential at node 46 simply tracks that at node 43. Similar remarks apply to the fourth waveform of FIG. 2, which depicts the voltage at node 47.

Figure 3:
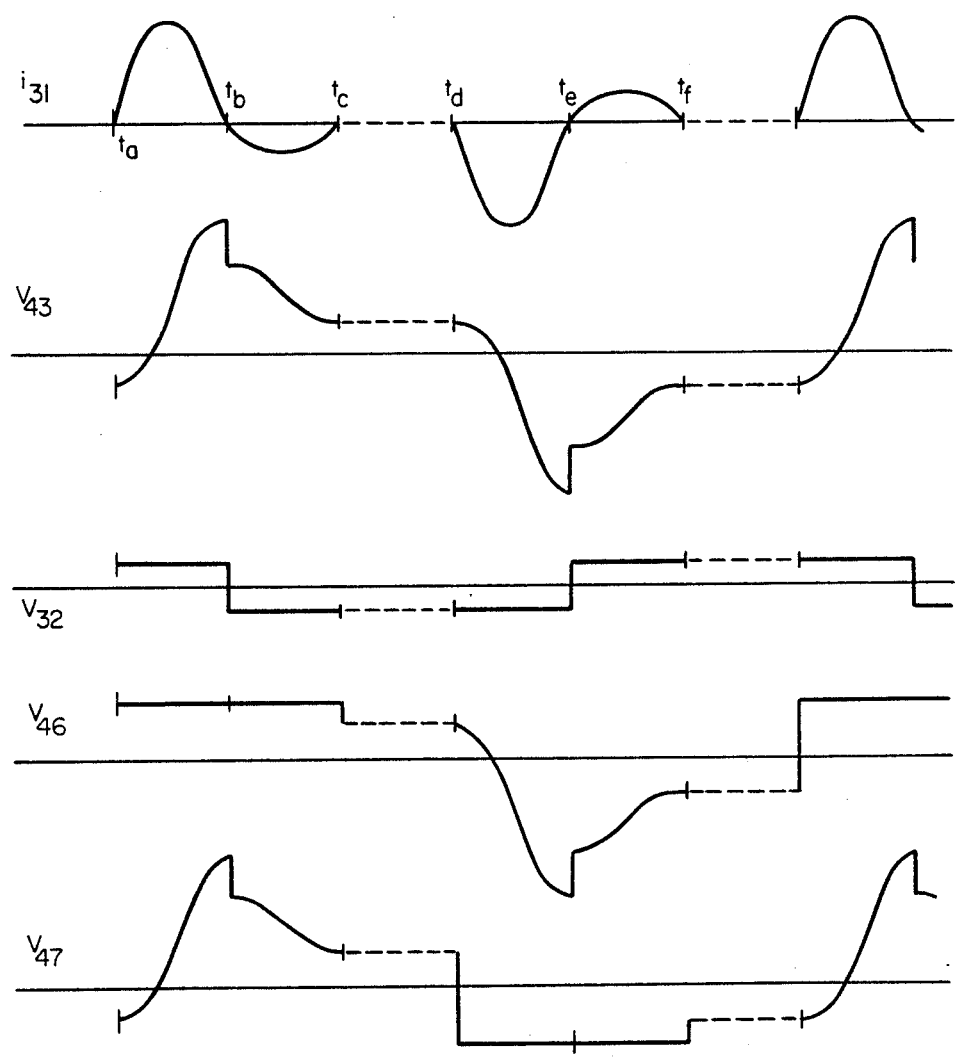
FIG. 3 depicts typical voltage and current waveforms applicable to the circuit of FIG. 1 for a non-shorted load.

The analysis above for the case of a zero impedance load always applies insofar as the cessation of current flow is concerned at the end of each cycle of operation, but it is not true in the case of a real load that the potential across the capacitor 31 is zero at the end of each cycle. There are also abrupt steps in the voltage at node 43 (and therefore at nodes 46 and 47) at time $t_b$ and time $t_e$ when the direction of current reverses in the resonant circuit, and the current in the conducting output rectifying diode 33 momentarily stops before the rectifying diode connected to the opposite phase of the transformer secondary winding begins to conduct into the load capacitor 34. When a voltage is developed across a real load, the current though capacitor 31 is lower in magnitude during conduction of the commutating diodes than when the SCRs conduct. However, while the polarity of the charge on the capacitor is reversed between alternate cycles, a degree of symmetry is maintained in that at the beginning of each cycle the magnitude of the starting voltage across the capacitor is the same, and the net DC current through the capacitor and the primary winding of the output transformer is zero. FIG. 3 depicts waveforms comparable to those of FIG. 2 for a non-shorted load, one which results in a voltage waveform across the primary winding of transformer 32 which typically alternates between $+100$ and $-100$ volts. The idealized voltage waveform V32 across the transformer primary winding is also shown in FIG. 3.

As mentioned above, one of the main advantages of the prior art circuit of FIG. 1 is that whenever an SCR is fired, the resulting current constitutes only a single cycle of an oscillating waveform, the current flowing through the SCR during the first half-cycle and through the respective commutating diode during the second half-cycle. The SCR turns off automatically when the current drops below the "holding" value, the diode turns off at the end of the cycle when the current attempts to reverse direction once again, and there is no second cycle of conduction because the SCR remains off. The rate at which the SCRs are fired determines the total power delivered to the load, and thus a simple voltage-to-frequency control circuit can be employed to vary the output potential across the load.

However, the disadvantage with the prior art circuit of FIG. 1 is the wide range of frequencies required to cover output voltage and current variations from zero to full specified values. It is difficult to obtain completely stable operation over such a wide range, and the effects of self-resonance in the output transformer can also produce instabilities in the control circuits at certain operating frequencies.

These problems are overcome in the present invention by the use of two series resonant power circuits and a new control circuit which combines phase control techniques with frequency control techniques to allow regulation of output voltage or current from zero to maximum values while maintaining a high operating frequency and a fast response time.

Phase control techniques have been used in prior art systems by combining two sine waves having the same amplitude and frequency and controlling the phase of one of the trains of sine waves relative to the other to smoothly vary the resulting sine wave output from essentially zero when out-of-phase, to twice the magnitude of the individual values when in-phase. Although this type of control system works with pure sine waves, it is not directly applicable to the series resonant power circuits shown in FIG. 1 because the actual current and voltage waveforms obtained with these resonant inverters are generally far from sinusoidal. The current waveforms generated in these circuits normally contain gaps and phase reversals between each successive sine wave cycle, and such variations do not allow the simple phasing of two such waveforms to provide smooth control of output amplitude.

A circuit for combining the sine wave output currents from two series resonant inverters is shown in FIG. 4. In this case, two full-bridge inverters are used, although the operation is equally effective in half-bridge circuits similar to that shown in FIG. 1 which are more generally used at lower power levels.

The first inverter comprises SCRs 50, 51, 52 and 53, reverse conducting diodes 54, 55, 56 and 57, resonating inductors 58, 59, 60 and 61, and resonating capacitors 62 and 63. The sine wave current in the first inverter, depicted as $i_1$ and $i_2$ in FIG. 4, is produced when trigger pulses are applied to the SCRs through trigger transformer TR1 secondary windings. The timing of these pulses is determined by the control circuits 68 which apply simultaneous pulses through a trigger circuit 90 to SCR 50 and SCR 53, and which subsequently apply simultaneous pulses to SCR 51 and SCR 52. (The two trigger curcuits 90 and 91 are standard pulse shapers/drivers.)

Similarly, the second inverter comprises SCRs 70, 71, 72, and 73, diodes 74, 75, 76 and 77, inductors 78, 79, 80 and 81, and capacitors 82 and 83, with triggers to the SCRs supplied form a separate trigger circuit 91. The control curcuits 68 allow independent triggering of the first inverter relative to the second so that the relative phases of the current waveforms in the two inverters can be controlled.

The current $i_5$ in the primary of the output transformer 84 is the sum of the currents in the two inverters. With this arrangement, it is possible to control and synchronize the frequency and phase of the current pulses in any desired manner.

The terms frequency and phase must be clearly understood. Referring to current $i_{31}$ on FIG. 3, for example, the frequency determines the period of an overall cycle. Since the resonant period of each SCR and diode conduction cycle is fixed by values of inductance and capacitance, the repetition frequency—the rate at which the SCRs are fired—determines the lengths of the gaps in the waveforms. The term phase can be understood by considering another identical current waveform $i_{31}$. If the two of them can be superimposed in time, then they are in phase. If one of them is shifted relative to the other, then there is a relative phase difference between them.

The SCRs are gated by two pulse transformers, TR1 and TR2, each having four secondary windings. Each transformer is driven by a differentiated square wave whose duty cycle is always 50:50. The differentiated pulse derived from the positive edge of the square waveform applied to the TR1 trigger circuit fires SCRs 50 and 53; the differentiated pulse derived from the negative edge of the square waveform applied to the TR1 trigger circuit fires SCRs 51 and 52. Similarly, an identical (phase-shifted) waveform applied to the TR2 trigger circuit controls firings of the SCRs in the second inverter.

Figure 5:
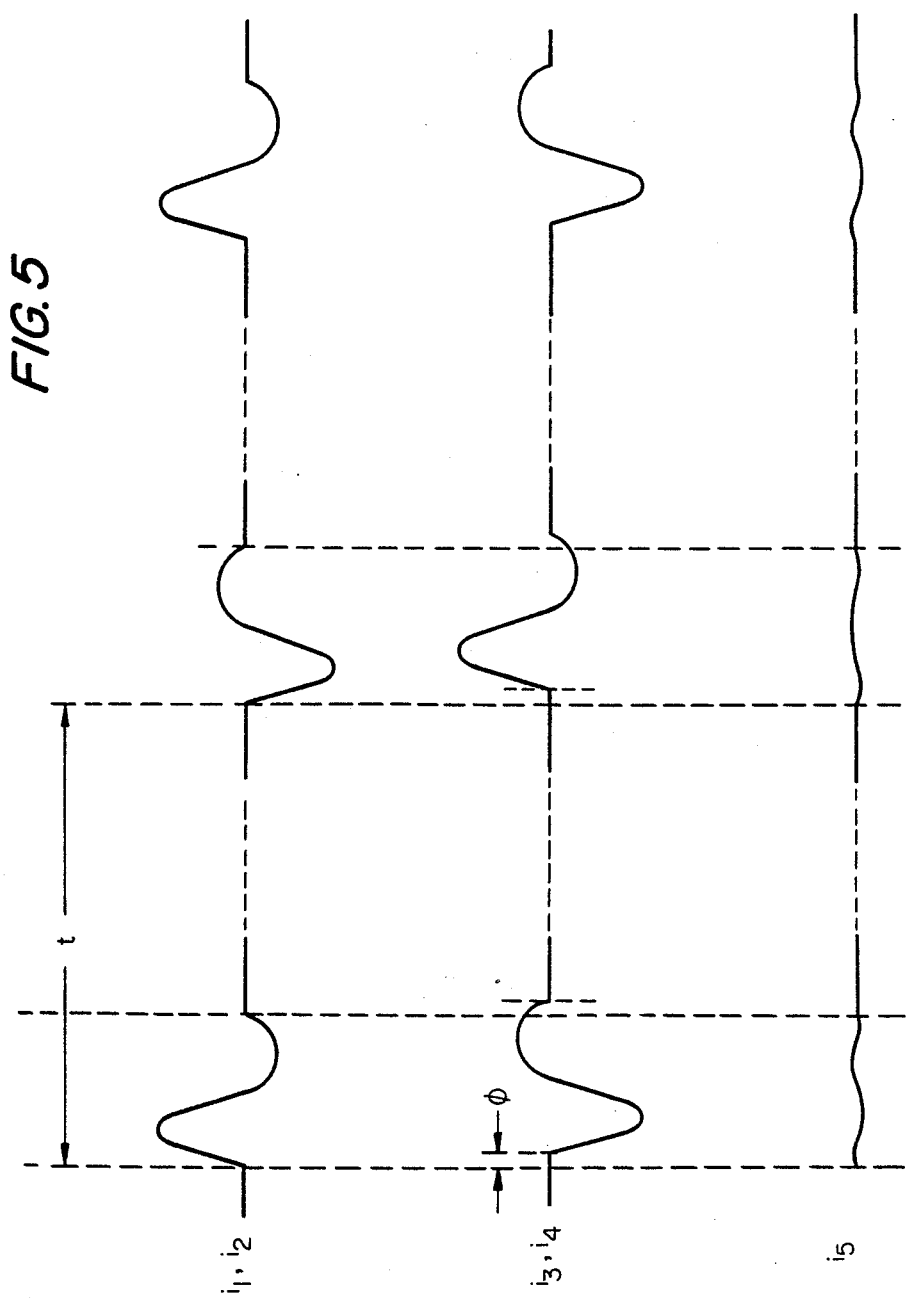
FIGS. 5-8 depict current waveforms applicable to the circuit of FIG. 4 for conditions of increasing power output.
Figure 6:
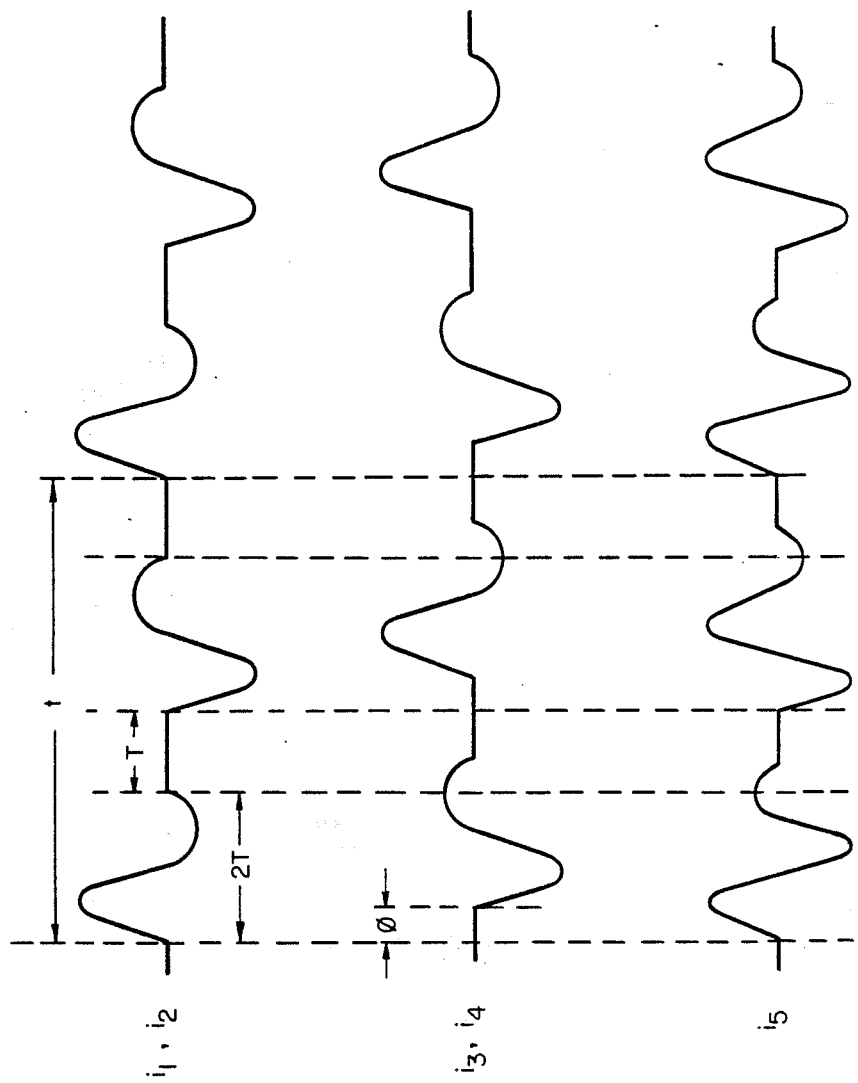
Figure 7:
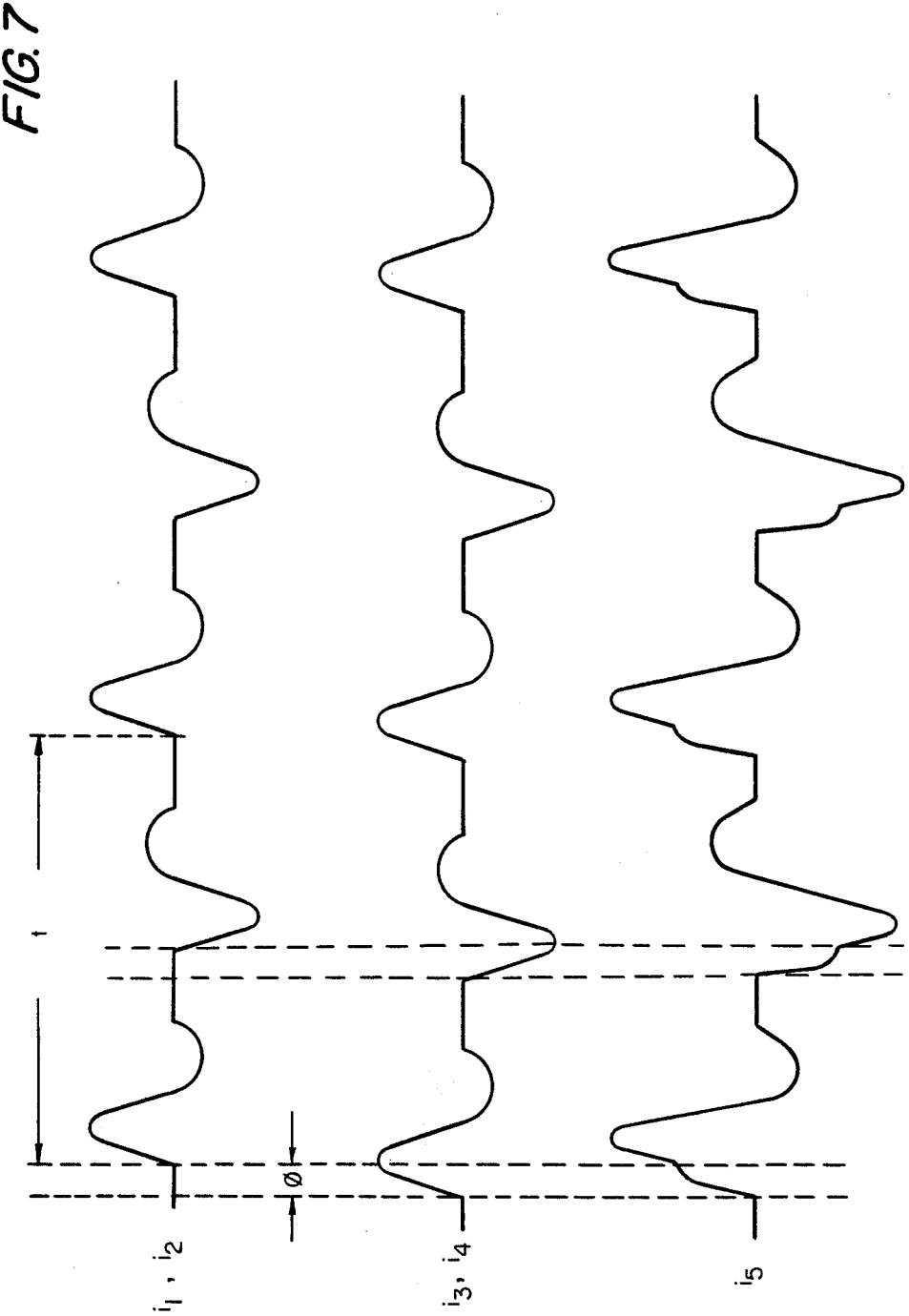
Figure 8:
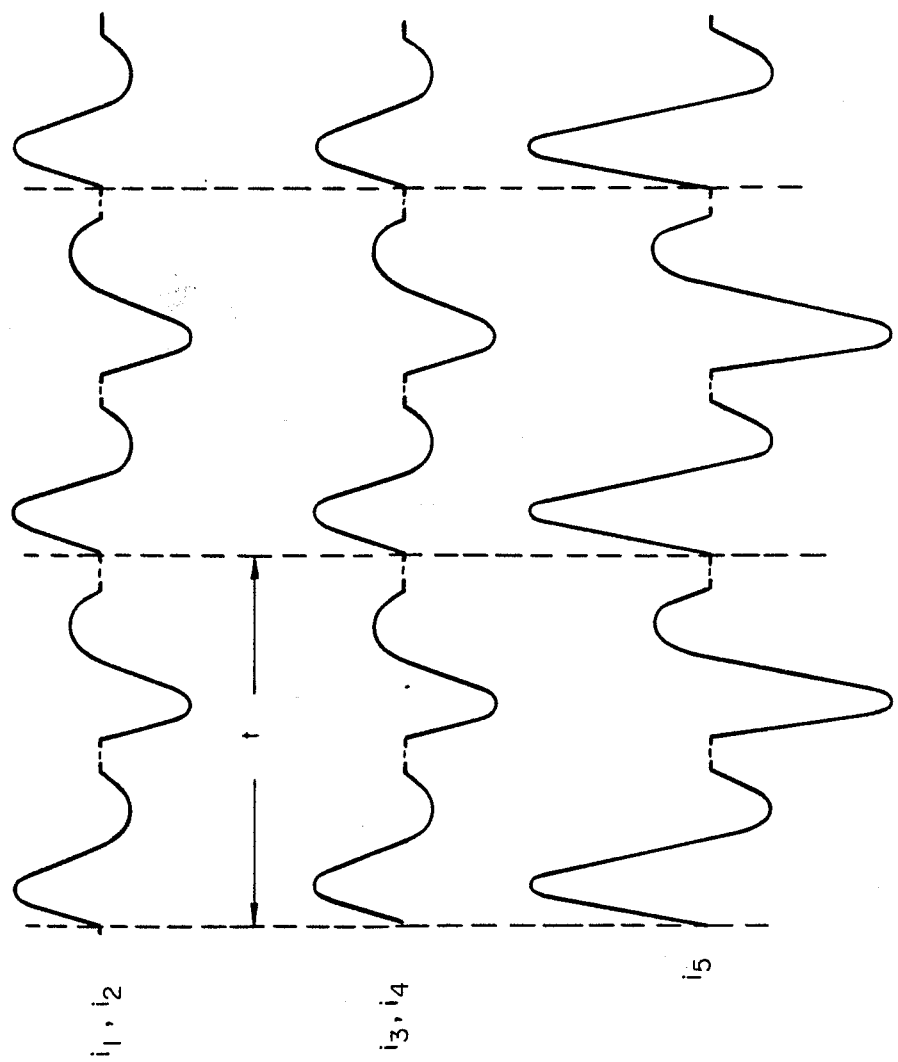

As an example of the system operation, the frequency can be held constant and the phase of the current waveform in one inverter can be controlled relative to the other. FIG. 5 shows applicable waveforms when the current in one inverter ($i_1$, $i_2$) is substantially out of phase with the current in the other ($i_3$, $i_4$). If these waveforms are identical in amplitude and shape, then the combined output, $i_5$, is ideally zero. As the phase of the current waveform in one inverter is changed relative to the phase in the other, the resulting output current progressivly increases as depicted in FIGS. 6 and 7 until the current waveforms are completely in phase. In these cases, a gap of one-half the resonant period typically separates the waveforms of the two inverters. If the repetition frequency then increases, as depicted in FIG. 8, the gap decreases.

Figure 9:
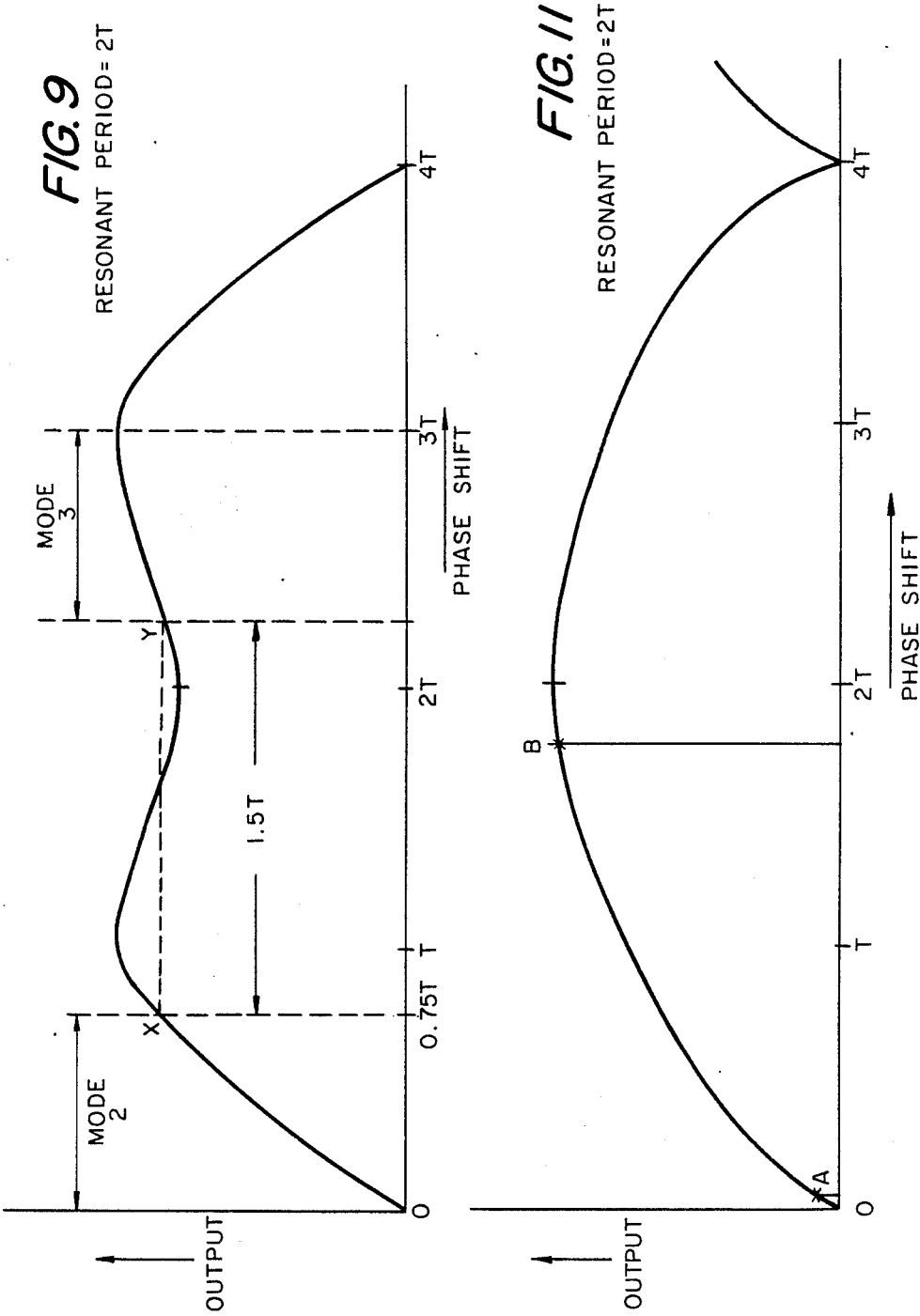
FIG. 9 depicts the transfer function of the current available at the load resulting from the phase shift between paired currents in the circuit of FIG. 4.

The transfer function of the current available at the load resulting from the phase shift between the current waveforms is depicted in FIG. 9. The increase in output current reaches a first maximum at a phase shift equal to one-half period (T) of the resonant sine wave, and then drops off as the phase shift increases to twice the period before rising again to a maximum when the waveforms are completely in phase. (Referring to FIG. 6, a phase shift of 3T in one of the two upper waveforms produces congruence; FIG. 8 depicts such substantially in-phase currents.)

Figure 10:
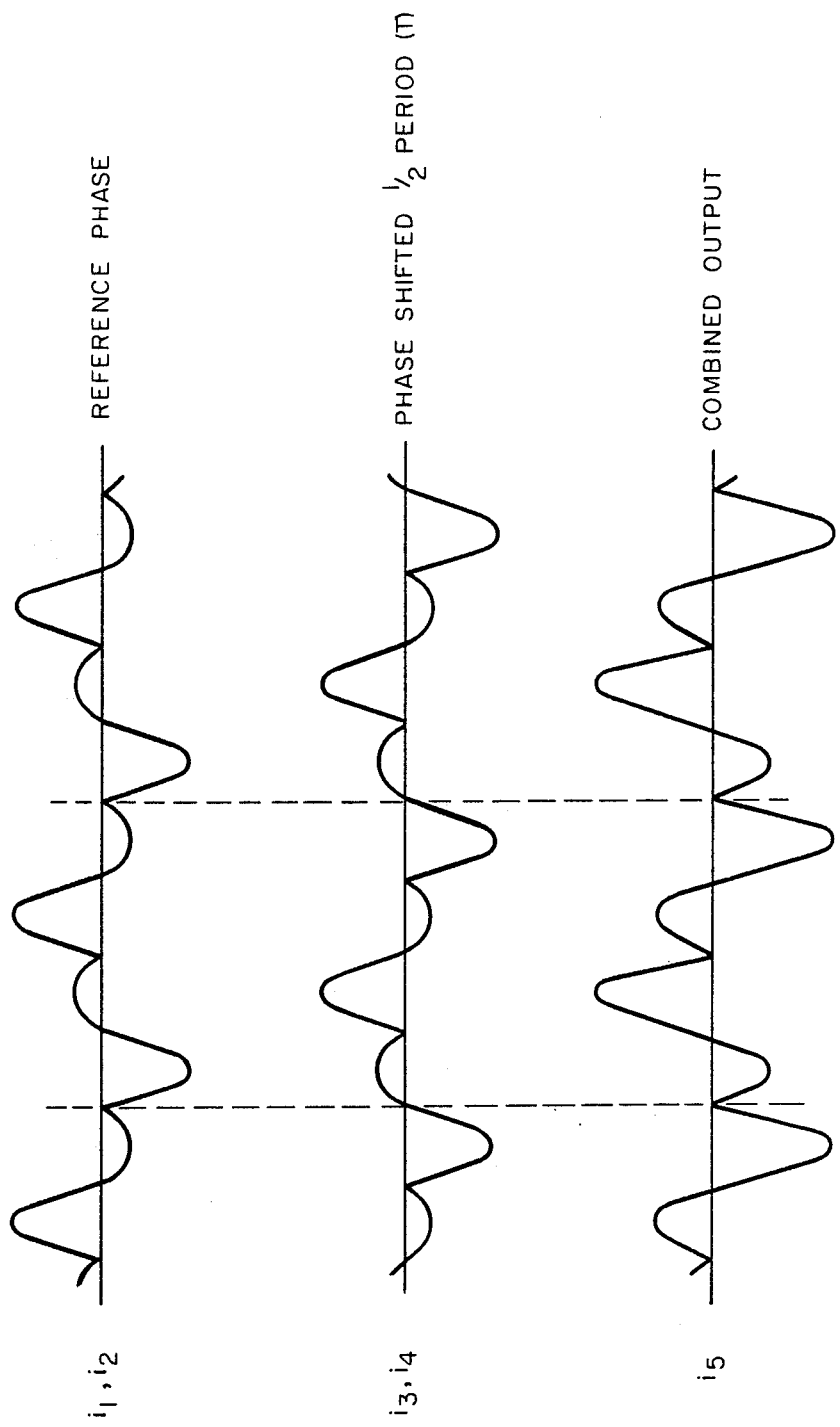
FIG. 10 depicts current waveforms applicable to the circuit of FIG. 4 for "no-gap" current waveforms.

A different situation can exist at higher repetition frequencies, for example, when the operating frequency is set to one-half the resonant frequency in the inverter, as depicted in FIG. 10. There are no gaps in the waveforms, and the transfer function of output current relative to phase shift is monotonic over the range of the resonant period (2T). FIG. 11 shows a typical transfer function when the relative phase of the current waveforms in the two inverters changes over a range of four resonant periods. The output current reaches a maximum value at a phase shift of 2T, then decreases to zero at 4T.

For stable operation with a feedback control loop, phase shift should be limited within the range between a few degress form out-of-phase to a few degrees before true in-phase, as depicted in FIG. 11 between points A and B. Operation at output current levels between point and zero current can be controlled by adjusting the frequency from its fixed value (half the resonant frequency) down to zero. Such operation in two modes, a "frequency mode" from zero output current to a few percent of full output (point A in FIG. 11), and a "phase mode" from this point up to in-phase operation at point B, is a simple form of multi-mode control. However, in many practical applications there are limitations in the use of two-mode operation. Problems can arise because the inverters normally operate at maximum frequency, i.e., giving rise to continuous (no-gap) conduction, as depicted in FIG. 10 even for low power outputs. This means that maximum currents circulate, even though the output power is low because the currents cancel in the output transformer. It is often desirable to operate below this maximum frequency to minimize the possibilities of shoot-through conditions occurring in the inverters which could be caused, for example, by an SCR having an abnormally long turn-off time. Also, in very high-power inverters using SCRs with turn-off times in the 15 us range, it is often desirable to operate in a discontinuous current mode in order to prevent shoot-throughs.

In a practical circuit, there is also some interaction between the current waveforms when driving a DC load through the output transformer, and this interaction may cause shoot-through conditions to occur. For these reasons, there are advantages in operating in the discontinuous conduction mode when using phase control. The discontinuous mode allows gaps in the current waveforms which tend to eliminate the undersirable waveform interaction that occurs in the region of phase cancellation.

Typical discontinuous conduction waveforms are depicted in FIGS. 6 and 7 where the gap in each waveform is one-half the period of the inverter resonant circuit. The transfer function of output current relative to phase shift in this case is shown in FIG. 9. It will be noted that when the phases approach substantial cancellation, as shown in FIG. 6, there are six output current ($i_5$) reversals (zero crossings) per repetition period. On the other hand, when the phases approach substantial reinforcement of each other, as shown in FIG. 7, there are only two output current reversals. This means that the voltage waveforms developed across the transformer windings due to these current waveforms have a frequency three times higher at phase shifts between phase cancellation and a phase shift of T (FIG. 9), than at phase shifts between 2T and 3T. Because of the high frequency losses in the transformer core and rectifiers, and losses resulting from driving the capacitance of the transformer windings (which can be significant with large step-up ratios), the actual maximum load current available is higher when the phases add at the second peak in the transfer function (FIG. 9) than at the first peak. (FIG. 9 is theoretical only; in actual practice, the second peak is higher than the first for the reasons stated.) In order to obtain optimum performance over the total power range from zero to maximum, four modes of operation rather than two are preferred, the four modes being depicted in FIGS. 5–8 as will now be described.

Figure 13:
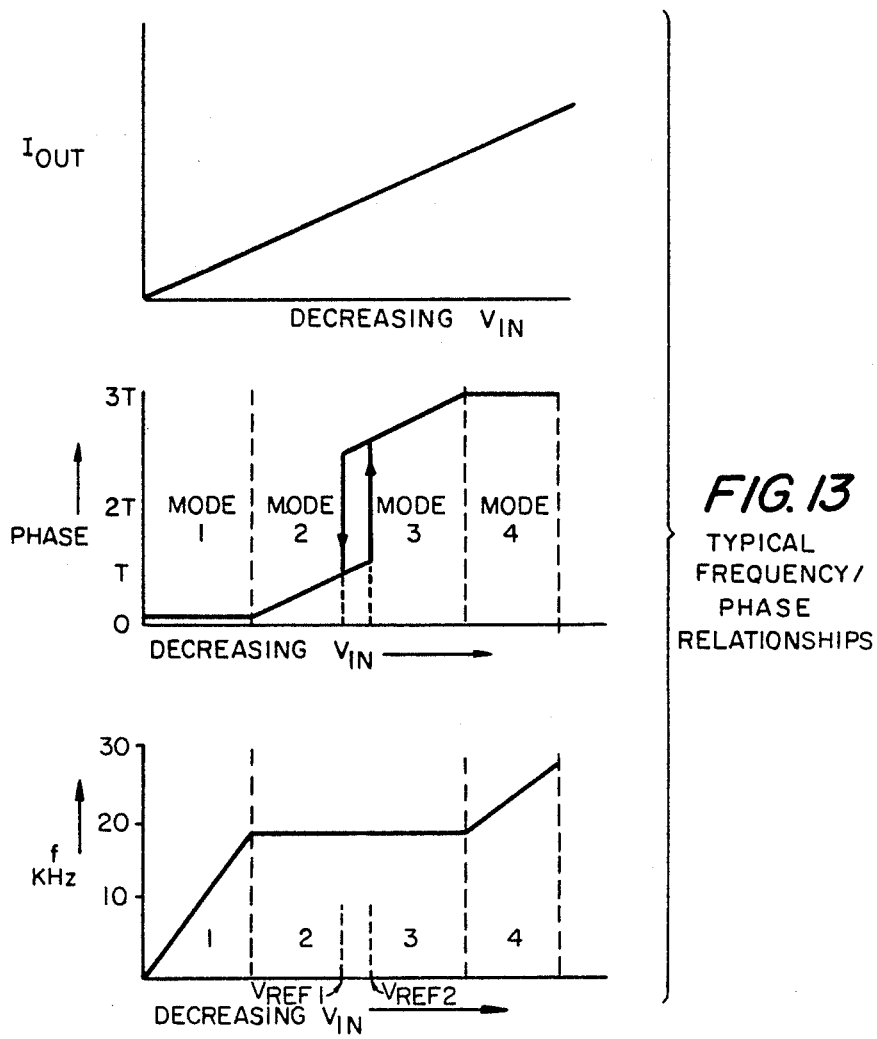
FIG. 13 depicts three functions which characterize the operation of the system of FIG. 4.

The first mode (mode 1) uses a fixed phase relationship, with near cancellation of the current waveforms, and frequency modulation to obtain control from zero up to about one or two percent of maximum output current, as illustrated in FIG. 13. This figure depicts three parameters—output current, phase (the phase difference between the two current waveforms), and repetition frequency (rate of SCR firings)—as a function of decreasing $V_{IN}$. As will be described with reference to FIG. 12, as $V_{IN}$ (the potential at node 106) decreases, there is a need for a larger output current. The current waveforms of FIG. 5 apply to mode 1 operation. The rate is adjusted in mode 1 so period t in FIG. 5 is variable, and this frequency change is shown in the bottom waveform of FIG. 13. The phase, which provides for substantially complete cancellation, is fixed, as shown in the middle waveform of FIG. 13; SCRs in both inverters are fired practically simultaneously.

Mode 2, depicted in FIG. 6, starts at the point where the operating frequency reaches about one third of the resonant frequency. This means that the gap between current pulses is half the width of each pulse. At this point, the frequency is held essentially constant and any further increase in output current is obtained by shifting the phase of one of the current waveforms relative to the other, as depicted in FIG. 13. When the phase shift reaches about 0.75T (point X in FIG. 9), a step function in phase of approximately 1.5T is applied to bring the operation into mode 3 at point Y (see FIG. 7 and FIG. 9). As shown in FIG. 13, there is a hysteresis type of operation which will be described below. The phase between the two current waveforms continues to be changed in order to increase output as shown in FIG. 13. Once the current waveforms are completely in phase, the operating mode is changed to mode 4 (see FIG. 8). The phase relationship is now held constant, and the frequency is increased up to the point of continuous conduction to obtain more power, as illustrated in FIG. 13.

To summarize, the power modes in the preferred embodiment of the invention are as follows:

Mode 1—Controls the output current from zero to a few percent of maximum (depending on the degree of current waveform cancellation in the two inverters) by frequency control.

Mode 2—Controls the output current from a few percent of maximum up to about 50% by progressively reducing phase cancellation. Frequency remains essentially constant, typically between 16 KHz and 20 KHz.

Mode 3—Controls the output current from about 50% to about 70% of maximum by progressively bringing the current waveforms into phase. Frequency remains essentially constant, typically between 16 KHz and 20 KHz.

Mode 4—Controls the output current from about 70% to maximum by increasing the operating frequency up to the point where the current waveforms start to overlap. Current waveforms remain in phase.

It is only in mode 1 that there is ever low-frequency (audible range) operation. But there is no annoying hum even in mode 1 because the power levels are so low. Due to the fact that there is substantial current cancellation because of the out-of-phase operation, the frequency must rise rapidly to a high value even to achieve relatively low power levels. In modes 2 and 3, a fixed frequency is selected which provides the 2T:T current-to-gap ratio shown in FIG. 6. This ratio is advantageous because it keeps the average value of the individual inverter currents low when high power is not needed, and it allows more than sufficient "resting time" in each inverter circuit. While it is not critical to have a precise 2T:T ratio, it is advantageous to do so from the point of view of control implementation. It is in mode 4 that the frequency rises to a point where the current waveforms in an individual inverter circuit can just touch, with the gaps in FIG. 8 reducing down to zero as depicted in FIG. 10. It is even possible in this mode to have a little overlap.

Various circuit techniques can be applied to achieve the desired multi-mode operation, but that of the illustrative embodiment of the invention is particularly efficient and cost effective. As previously mentioned, stability in the feedback loop requires the control circuits to be monotonic. In other words, a unidirectional voltage change at the input of the control amplifier should cause a unidirectional change in output current. This characteristic is obtained in an elegant manner by utilizing a non-linear circuit element, such as a Zener diode, which operates in an analog fashion and has a continuous smooth transfer characteristic.

Figure 14:
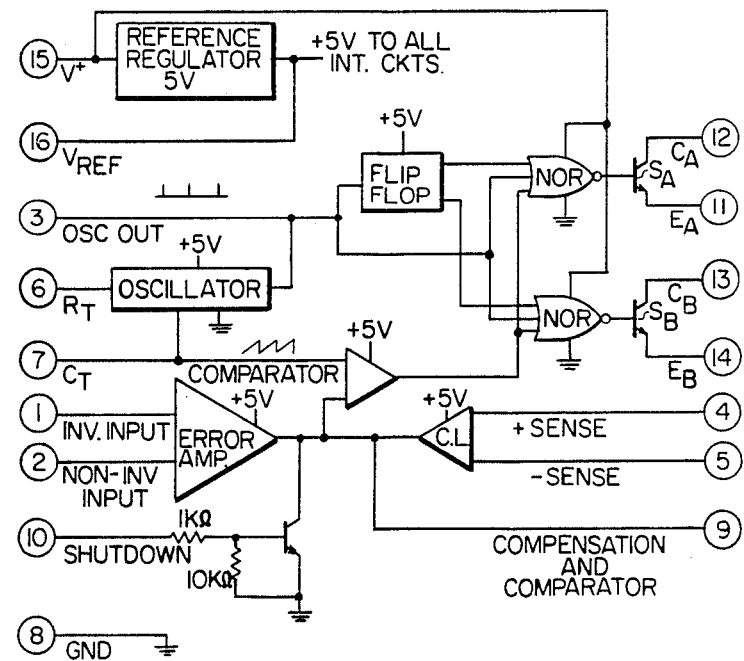
FIG. 14 depicts symbolically the Silicon General SG3524 pulse width modulator integrated circuit.

A preferred method of providing the control of frequency and phase of two resonant inverters takes advantage of the circuit elements contained in the Silicon General (second sourced by RCA, Unitrode and others) SG3524 pulse width modulator integrated circuit. A functional block diagram of the SG3524 integrated circuit is shown in FIG. 14. In its intended use for pulse width modulation, the oscillator operates at a fixed frequency determined by the values of an external timing capacitor and an external resistor connected respectively between terminals 7 and 6, and common.

The oscillator resets a ramp voltage across the capacitor connected to pin 7, and the ramp voltage is compared with the voltage at the output of the internal error amplifier to which control and reference voltages are narmally applied. The push-pull outputs on pins 12 and 13 are pulse-width modulated according to the inputs applied to the error amplifier. The SG3524 is widely employed as a pulse width modulator in switching power supplies where the operating frequency is fixed, typically at a frequency between 20 KHz and 200 KHz. However, in our multi-mode operation, the SG3524 is operated in a different way to provide both phase and frequency modulation. Instead of operating at a fixed frequency, the oscillator is modulated from zero to about 100 KHz.

Frequency control is obtained by controlling the current drawn out of pin 6. Referring to FIG. 15, the two currents $I_o$ are equal since they are derived from a current mirror. The $I_o$ current through pin 7 charges timing capacitor 101. Thus as the $I_o$ current from pin 6 is controlled, since the two $I_o$ currents must be equal, the charging of capacitor 101 is determined. The voltage at pin 6 is determined by the internal oscillator circuit of the SG3542 and remains at approximately +3.6 V for all values of charging current in the external capacitor 101 and at all frequencies above zero. The charging current can be varied either by adjusting the value of external resistor 100 connected from pin 6 to common, or by keeping the resistor value constant and adjusting the current applied to node 103 through resistor 105.

A nominal charging current is established by connecting external resistor 100 from pin 6 to common. Current is subtracted from or added to this nominal value through resistor 105 in mode 1 and mode 4 respectively, as described below. A typical value for resistor 100 is 3000 ohms which produces a capacitor charging current of 3.6/3000=1.2 mA. The value of external capacitor 101 connected between pin 7 and common is selected to give the desired operating frequency of the inverters in mode 2 and mode 3, typically 18 KHz. (In these two modes, current $I_o$ through pin 6 remains constant as Zener diode 108 does not conduct.)

The frequency of the oscillator is varied by a change in voltage at the output of error amplifier 107 at node 106, which voltage change varies the current through resistor 105 and Zener diode 108. When the voltage at node 106 causes Zener diode 108 to be non-conducting, the oscillator runs at its nominal frequency. This condition applies in mode 2 and mode 3. When Zener diode 108 conducts either in the forward or reverse direction due to the voltage at node 106 causing the voltage across the Zener diode to be positive or to exceed the reverse breakdown voltage, current $I_1$ through resistor 105 subtracts from or adds to current $I_o$ out of pin 6. Since current $I_2$ is always a constant value of 1.2 mA, any change in current $I_1$ causes an equal change in current $I_o$.

The control circuit is driven by the output of error amplifier 107 which causes the power supply to regulate its output voltage (or current) to maintain the set value under all load conditions. For zero output voltage from the power supply (zero voltage setting), the frequency of the oscillator should be zero. This occurs when the current $I_o$ is equal to zero. The output voltage at node 106 is then high enough to supply all the current in resistor 100. If resistor 105 has a value of 5000 ohms, then its voltage drop at 1.2 mA is 6 V. With a forward voltage drop across the Zener diode of 0.7 volts, the voltage at node 106 is 3.6+0.7+6=+10.3 V to produce $I_o=0$.

As the control voltage (on conductor 68B) is progressively increased, the voltage at node 106 continues to fall, causing $I_o$ to increase, thereby increasing the oscillator frequency. At these very low power levels, the phases of triggers to the SCRs are arranged so that the currents in the two inverters tend to cancel. This occurs because the relatively high voltage at node 109 applied to resistor 110 causes the output of amplifier 114 to be low at essentially the same voltage as the start of the voltage ramp at node 104. This voltage ramp has a total swing from +0.6 V to +3.5 V. When the voltage at node 115 is at 0.6 V, the output pulse from the comparator is very narrow, and this narrow pulse appears at the phase A output. The negative going edge of this waveform triggers one inverter through flip-flop 132 on FIG. 16, while the positive going edge triggers the other inverter through flip-flop 131 so that the current pulses in the two inverters tend to cancel, as depicted in FIG. 5. The relationship of the SCR trigger pulses to Phase A and Phase B are depicted in FIG. 17.

The pulse width of Phase A continues to be narrow until the voltage at node 109 drops to +4.3 V and the Zener diode 108 stops conducting in the forward direction. At this point, the oscillator is running at its nominal frequency and any further increase in control voltage will cause the circuit operation to change from mode 1 to mode 2.

Figure 18B:
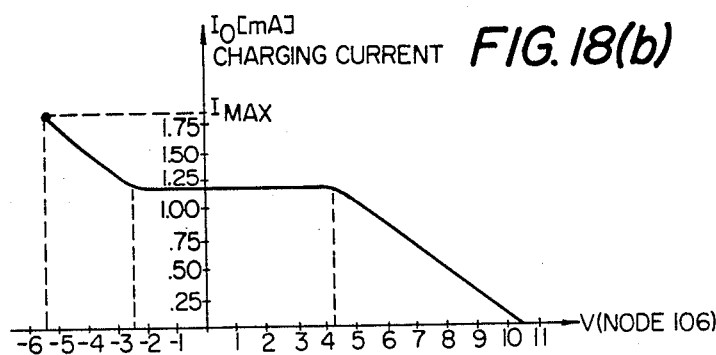
Figure 18C:
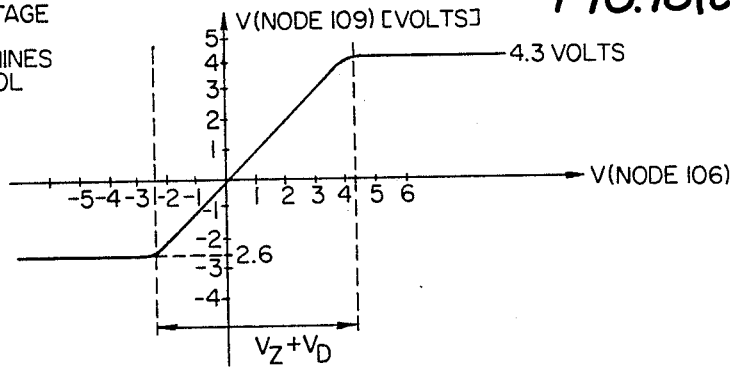

Referring to FIG. 18, in mode 1 the Zener diode conducts in the forward direction and its voltage drop is constant at $V_D$ (0.7 volts). Node 109 is therefore held at a constant potential (4.3 volts, as shown in FIG. 18(c), and the potential at node 115 is held at 0.6 volts. As the Zener diode starts to turn off with a further decrease in potential at node 106, the voltage at node 109 starts to fall (FIG. 18(c)), and the voltage at node 115 starts to increase. At the same time that the voltage at node 109 starts to change, current $I_o$ becomes constant since the Zener diode ceases to conduct. That is why the earlier frequency control (FIG. 18(b)) now ceases in favor of phase control (FIG. 18(c)). As the control voltage (68B) increases and the voltage at node 115 also increases, the output of comparator 116 remains low for a longer interval at the start of each ramp waveform. This causes the Phase A pulse to be wider. Referring to FIGS. 16 and 17, the width of the Phase A pulse determines the time interval between the rising edge of the TRIG1 waveform and the falling edge of the TRIG2 waveform. Since this time interval determines the phase shift between the two inverter operations, as the time interval increases the inverters become less out of phase and the power level increases.

The values of the resistors around the internal error amplifier 114 are carefully chosen so that the output voltage at node 115 starts to rise just when Zener diode 108 turns off. This allows for simultaneous turn-off of frequency control and turn-on of phase control, i.e., the right knees in the FIG. 18(b) and FIG. 18(c) characteristics occur at the same voltage value for node 106. It is the smooth right knee in the Zener characteristic of FIG. 18(a) that gives rise to a smooth transition from frequency to phase control. (It is the left knee that does the same thing as a transition takes place between modes 3 and 4.) The gain of amplifier 114 is determined by the ratio of resistor 111 to resistor 110 so that the voltage swing at node 115 covers the range of the ramp voltage (+0.6 V to +3.5 V). This 2.9 V swing occurs as the voltage at node 109 swings through the non-conducting range of the Zener diode. For a compensated Zener diode with reverse voltage breakdown of 6.2 V, the non-conducting voltage range (with its cathode clamped at +3.6 V) is from +4.3 V to −2.6 V, or a total swing of 6.9 V. This assumes a sharp knee in the Zener breakdown characteristic. In reality, the Zener typically starts to conduct at about 5.9 V applied in the Zener breakdown direction. To cover tolerances, the gain of error amplifier 114 is nominally set so that a swing of 6.6 V at node 109 corresponds to a swing of 3 V at node 115. This condition is realized when resistor 111 is 100K and resistor 110 is 220K. The ration of resistor 112 to resistor 113 is set so that the voltage level at node 115 is +0.5 V when the voltage at node 109 is +4.3 V. To satisfy this condition, the voltage at the junction of resisor 112 and resistor 113 should be 1.7 V. If the reference voltage at node 117 is +5 V, the values of resistors 112 and 113 could be 200K and 100K, respectively, to give 1.7 V at their junction.

In mode 2 and 3, the width of the Phase A and Phase B pulses increases from a minimum value to almost a 50% "on-to-off" ratio as the voltage at node 115 increases from +0.6 V to +3.5 V. At the nominal operating frequency in mode 2 and mode 3, the duration of the ramp determined by the values of resistor 100 and capacitor 101 represents a time equivalent to 0.75 of a resonant period (i.e., 1.5T) of the inverter LC circuit. A voltage range from 0.6 V to approximately 2 V at node 115 controls the phase in mode 2. In other words, only the first half of the ramp is used in mode 2.

The voltage at node 109 can vary between +4.3 V and +1 V in mode 2. To prevent the possibility of instability at the change form mode 2 to mode 3, hysteresis is built into the circuit. The voltage at node 120 is therefore set to a level lower than +1 V while the voltage at node 121 is set higher than +1 V. When the voltage at node 106 falls below the voltage at node 120, comparator 122 changes state and sets latch 124. The output from the latch is applied to the D input of flip-flop 130 in FIG. 16 which gates Phase B pulses (to clock flip-flop 131), instead of Phase A pulses. (A sync pulse at pin 3 of the SG3524 is used to clock flip-flop 130.) Since the time between Phase A and Phase B pulses is equivalent to one ramp period, the phase shift of the trigger pulses form mode 2 to mode 3 is the required 1.5T, where T is one-half of the resonant period of the inverter LC circuit.

In mode 3, phase shift continues depending on the pulse width of the output of comparator 116 as the control input 68A is increased. When maximum phase shift is reached, the voltage at node 109 is at −2.6 V and Zener diode 108 begins to conduct in the reverse breakdown direction. Current $I_1$ then flows in the reverse direction and causes an equal increase in current $I_o$, thereby increasing the oscillator frequency. This is the start of mode 4 in which the two inverters operate essentially in phase.

In mode 4, the power increase is a function of repetition frequency. The duration of the inverter output current waveform is equal to three times the duration of the resonant period in modes 2 and 3. At maximum output (at the high end of mode 4), the repetition period is twice the resonant period. This frequency change is produced by an increase in current $I_o$ from 1.2 mA to 1.8 mA. If resistor 105 has a value of 5000 ohms, the voltage at node 106 changes from −2.6 V to −5.6 V for a 0.6 mA change in current.

In summary, the voltage at node 106 changes from +10.3 V to −5.6 V, corresponding to a change from zero output to full load output as follows:

Mode 1 +10.3 V to +4.3 V
Mode 2 +4.3 V to +0.5 V*
Mode 3 +1.5 V* to −2.6 V
Mode 4 −2.6 V to −5.6 V The asterisks represent hysteresis, obtained by applying approximately +0.5 V to node 120 and approximately +1.5 V to node 121.

The type of logic, method of control and the number of operating modes are variables that depend on the application of the power supply. However, these variables do not affect the basic principle of the invention which requires multiple modes of operation with a combination of frequency and phase control to keep the inverter frequency high under all loading conditions and provide smooth control from zero to maximum values of voltage or current without discontinuities appearing at the output.

Although the invention has been described with reference to a particular embodiment, it is to be understood that this embodiment is merely illustrative of the application of the principles of the invention. For example, other non-linear devices (preferably having a continuous smooth transfer characteristic and operating in an analog fashion) can be used in place of a Zener diode for control purposes. Thus it is to be understood that numerous modifications may be made in the illustrative embodiment of the invention and other arrangements may be devised without departing from the spirit and scope of the invention.

We claim:

1. An inverter system comprising a DC input power source; two resonating current sources powered by said DC input power source and resonant at the same frequency; means for combining the currents in the two current sources; and control means, responsive to the combined currents varying from a selected value, for adjusting both the frequency of operation of both current sources and their relative phases in directions which tend to cause said combined currents to approach said selected value.

2. An inverter system in accordance with claim 1 further including means for causing said control means to operate in a plurality of distinct modes in respective power ranges, in each of which only one of the frequency and the relative phases is adjusted.

3. An inverter system in accordance with claim 2 wherein at low power levels said control means causes the currents to be substantially out of phase and the frequency to be adjusted.

4. An inverter system in accordance with claim 3 wherein at intermediate power levels said control means causes the frequency to remain fixed and the relative phases to be adjusted.

5. An inverter system in accordance with claim 4 wherein at intermediate power levels said control means normally adjusts the relative phases in a continuous manner, and further including means responsive to the power level reaching a predetermined value for causing a substantial discrete step change in the relative phases, said predetermined value being such that the power level is substantially the same for the relative phases before and after the step change takes place.

6. An inverter system in accordance with claim 4 wherein at higher power levels said control means causes the relative phases to remain fixed and the frequency to be adjusted.

7. An inverter system in accordance with claim 6 wherein at higher power levels said control means causes the currents to be substantially in phase.

8. An inverter system in accordance with claim 2 wherein said control means includes first means for adjusting said frequency of operation, second means for adjusting said relative phases, means for representing the magnitude of the difference between said combined currents and said selected value, and nonlinear circuit means responsive to said representing means to switch control between said first and second means.

9. An inverter system in accordance with claim 8 wherein said non-linear circuit means has a continuous smooth transfer characteristic.

10. An inverter system in accordance with claim 9 wherein said non-linear means is an analog device.

11. An inverter system in accordance with claim 2 wherein at intermediate power levels said control means causes the frequency to remain fixed and the relative phases to be adjusted.

12. An inverter system in accordance with claim 11 wherein at intermediate power levels said control means normally adjusts the relative phases in a continuous manner, and further including means responsive to the power level reaching a predetermined value for causing a substantial discrete step change in the relative phases, said predetermined value being such that the power level is substantially the same for the relative phases before and after the step change takes place.

13. An inverter system in accordance with claim 2 wherein at higher power levels said control means causes the relative phases to remain fixed and the frequency to be adjusted.

14. An inverter system in accordance with claim 13 wherein at higher power levels said control means causes the currents to be substantially in phase.

15. An inverter system in accordance with claim 1 wherein at low power levels said control means causses the currents to be substantially out of phase and the frequency to be adjusted.

16. An inverter system in accordance with claim wherein at intermediate power levels said control means causes the frequency to remain fixed and the relative phases to be adjusted.

17. An inverter system in accordance with claim 16 wherein at intermediate power levels said control means normally adjusts the relative phases in a continuous manner, and further including means responsive to the power level reaching a predetermined value for causing a substantial discrete step change in the relative phases, said predetermined value being such that the power level is substantially the same for the relative phases before and after the step change takes place.

18. An inverter in accordance with claim 1 wherein at higher levels said control means causes the relative phases to remain fixed and the frequency to be adjusted.

19. An inverter system in accordance with claim 18 wherein at higher power levels said control means causes the currents to be substantially in phase.

20. An inverter system in accordance with claim 1 wherein said control means includes first means for adjusting said frequency of operation, second means for adjusting siad relative phases, means for representing the magnitude of the difference between said combined currents and siad selected value, and non-linear circuit means responsive to said representing means to switch control between said first and second means.

21. An inverter system in accordance with claim 20 wherein said non-linear circuit means has a continuous smooth transfer characteristic.

22. An inverter system in accordance with claim 21 wherein said non-linear circuit means is an analog device.

23. A circuit for controlling the signal outputs of a pulse width modulator SG3524 integrated circuit to exhibit phase and frequency changes which are both functions of an input signal but which change over respective input signal voltage sub-ranges, with only one of the phase and frequency changing over each input signal sub-range, comprising an SG3524 integrated circuit having error amplifier in put means and a current control input from which current is drawn, resistor means connected to said current control input for drawing current, Zener diode means having a cathode connected to said current control input and an anode connected to said error amplifier input means, and means for coupling an in put signal to said anode.

24. A circuit in accordance with claim 23 wherein said input signal has an overall voltage range with three sub-ranges such that in the lowest and highest sub-ranges said signal outputs exhibit frequency changes but not phase changes, and in the middle sub-range siad signal outputs exhibit phase changes but not frequency changes.

25. A circuit for controlling the signal outputs of a pulse width modulator integrated circuit to exhibit phase and frequency changes which are both functions of an input signal but which change over respective input signal voltage sub-ranges, with only one of the phase and frequency changing over each input signal sub-range, comprising a pulse width modulator integrated circuit having error amplifier input means and a current control input through which current flows, resistor means connected to said current control input for allowing current to flow therethrough, non-linear circuit means having a first terminal coupled to said current control input and second terminal coupled to said error amplifier input means, and means for coupling and input signal to said non-linear circuit means.

26. A circuit in accordance with claim 25 wherein said input signal has an overall voltage range with three sub-ranges such that in the lowest and highest sub-ranges said signal outputs exhibit frequency changes but not phase changes, and in the middle sub-range said signal outputs exhibit phase changes but not frequency changes.

* * * * *